US009565746B2

(12) United States Patent
Nishioka et al.

(10) Patent No.: US 9,565,746 B2
(45) Date of Patent: Feb. 7, 2017

(54) PAIRING METHOD, LIGHTING DEVICE, AND LIGHTING SYSTEM

(71) Applicant: Panasonic Intellectual Property Management Co., Ltd., Osaka (JP)

(72) Inventors: Shinsuke Nishioka, Osaka (JP); Atsuo Nanahara, Kyoto (JP); Shigeo Gotoh, Osaka (JP); Tamotsu Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/091,377

(22) Filed: Apr. 5, 2016

(65) Prior Publication Data

US 2016/0302289 A1    Oct. 13, 2016

(30) Foreign Application Priority Data

Apr. 10, 2015    (JP) ................................. 2015-081182

(51) Int. Cl.
*H05B 37/02*    (2006.01)
*H04W 76/02*    (2009.01)
(Continued)

(52) U.S. Cl.
CPC ........... *H05B 37/0272* (2013.01); *G08C 17/02* (2013.01); *G08C 23/04* (2013.01); *H04W 76/02* (2013.01)

(58) Field of Classification Search
CPC ... H05B 37/02; H05B 37/0272; H05B 37/029; H05B 37/0245; H05B 33/0863; H05B 33/0845
(Continued)

(56) References Cited

U.S. PATENT DOCUMENTS 4,918,690 A * 4/1990 Markkula, Jr. .... G05B 19/0421
340/9.11
8,436,552 B2    5/2013 Komagata et al.
(Continued)

FOREIGN PATENT DOCUMENTS

JP    2005-538506 A    12/2005
JP    2010-081499 A    4/2010
(Continued)

*Primary Examiner* — Douglas W Owens
*Assistant Examiner* — Syed M Kaiser
(74) *Attorney, Agent, or Firm* — McDermott Will & Emery LLP

(57) ABSTRACT

A pairing method for causing lighting devices to store identification information of a radio remote controller serving as a master device is provided. The method includes: transmitting a pairing command including the identification information of the radio remote controller repeatedly on a temporary basis by the radio remote controller; determining, for each of the lighting devices, whether or not the lighting device is in an initial state in which identification information of a master device is not stored in the lighting device, at power on; storing the identification information included in the pairing command, if the paring command is received when it is determined that the lighting device is in the initial state in the determining; and causing the lighting device in which the identification information of the master device is stored to operate according to a radio command including the identification information of the master device.

15 Claims, 11 Drawing Sheets

(51) Int. Cl.
*G08C 17/02* (2006.01)
*G08C 23/04* (2006.01)

(58) Field of Classification Search
USPC .......... 315/149, 291, 292, 307, 308; 700/90, 700/275, 295, 296, 297
See application file for complete search history.

(56) References Cited

U.S. PATENT DOCUMENTS

| | | | |
|---|---|---|---|
| 2005/0128751 A1* | 6/2005 | Roberge | F21K 9/00 362/276 |
| 2006/0002110 A1* | 1/2006 | Dowling | F21K 9/00 362/249.05 |
| 2006/0044152 A1 | 3/2006 | Wang | |
| 2008/0221715 A1* | 9/2008 | Krzyzanowski | H04L 12/2805 700/90 |
| 2011/0275432 A1* | 11/2011 | Lutnick | G07F 17/3232 463/25 |
| 2011/0291586 A1* | 12/2011 | Komagata | G08C 17/00 315/291 |
| 2012/0023531 A1* | 1/2012 | Meuninck | H04N 21/4334 725/100 |
| 2015/0008831 A1* | 1/2015 | Carrigan | H05B 33/0842 315/153 |
| 2015/0048758 A1* | 2/2015 | Carrigan | H05B 33/0842 315/294 |

FOREIGN PATENT DOCUMENTS

| | | |
|---|---|---|
| JP | 2011-049009 A | 3/2011 |
| JP | 2011-249062 A | 12/2011 |
| JP | 2012-089276 A | 5/2012 |
| JP | 2012-089277 A | 5/2012 |
| JP | 2014-099369 A | 5/2014 |
| JP | 2014-229362 A | 12/2014 |
| WO | 2004023849 A | 3/2004 |

* cited by examiner

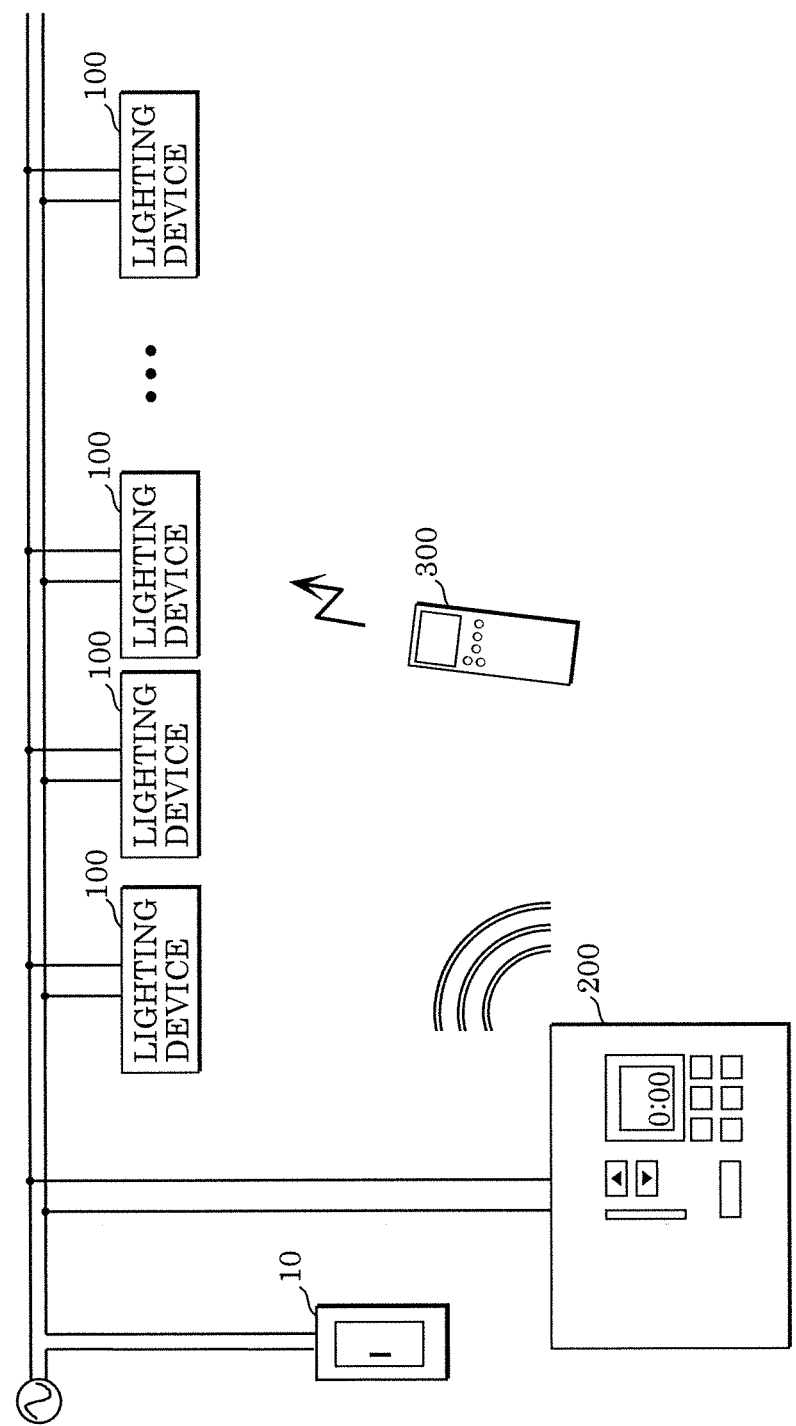

PAIRING METHOD, LIGHTING DEVICE, AND LIGHTING SYSTEM

CROSS REFERENCE TO RELATED APPLICATION

This application claims the benefit of priority of Japanese Patent Application Number 2015-081182 filed on Apr. 10, 2015, the entire content of which is hereby incorporated by reference.

BACKGROUND

1. Technical Field

The present disclosure relates to a pairing method, in a lighting system including a plurality of lighting devices and a radio remote controller, for causing the lighting devices to store identification information of a radio remote controller serving as a master device, and to a lighting device and the lighting system.

2. Description of the Related Art

For example, Japanese Unexamined Patent Application Publication No. 2012-89276 discloses a lighting control device which configures pairing using (i) a plurality of lighting devices each identified by identification information (ID) and having a radio wave receiving function and (ii) a radio remote controller having a radio wave transmitting function, by setting ID for identifying a communication partner. The lighting control device performs pairing by setting ID to a specific lighting device using a specific radio remote controller, lowers receiver sensitivity so that ID is not set by an unspecified radio remote controller which is present in the vicinity, and turns off a lamp in order to reduce the effects of noise due to lighting of the lamp. In such a manner, the lighting control device disclosed by Japanese Unexamined Patent Application Publication No. 2012-89276 prevents setting of ID by an unspecified radio remote controller which is present in the vicinity, and furthermore, reduces noise generated by the lamp.

However, it is necessary to lower the receiver sensitivity of the lighting device when configuring the paring. This involves cost increase due to inclusion of a receiver sensitivity adjuster, and an adjustment procedure for lowering the receiver sensitivity. Furthermore, since the lighting device is turned off when configuring the paring, the state of the lighting device is unclear.

An object of the present disclosure is to provide: a pairing method that allows easy pairing with less procedure in a lighting system including a plurality of lighting devices and a radio remote controller; a lighting device; and the lighting system.

SUMMARY

In order to achieve the above-described object, one aspect of the pairing method according to the present disclosure is a pairing method for use in installation work of a lighting system including at least one lighting device serving as a slave device and a radio remote controller serving as a master device to control the slave device, for causing the lighting device to store identification information of the radio remote controller, the method including: transmitting a pairing command repeatedly by the radio remote controller, the pairing command including the identification information of the radio remote controller; determining, by the lighting device, whether or not the lighting device is in an initial state at power on, the initial state including a condition in which identification information of any master device is not stored in the lighting device; if it is determined that the lighting device is in the initial state, storing the identification information included in the pairing command as the identification information of the master device in the lighting device when the paring command is received; and causing the lighting device in which the identification information of the master device is stored to operate according to a radio command including the identification information of the master device.

In addition, one aspect of the lighting device according to the present disclosure is a lighting device including: a transceiver which receives a radio command; a receiver which receives an infrared command; a storage for storing identification information of a radio remote controller serving as a master device; and a controller, wherein the controller determines whether or not the lighting device is in an initial state at power on, the initial state including a condition in which identification information of any master device is not stored in the lighting device, enters a pairing configuration mode when the controller determines that the lighting device is in the initial state, when a pairing command including identification information of the radio remote controller serving as the master device is received in the pairing configuration mode, stores the identification information of the radio remote controller serving as the master device as the identification information of the master device to the storage, and causes the lighting device to operate according to a radio command including the identification information, after storing the identification information of the master device.

In addition, one aspect of the lighting system according to the present disclosure is a lighting system including: a plurality of lighting devices each being configured to function as the lighting device described above; a radio remote controller having a pairing configuration mode for transmitting repeatedly on a temporary basis, a pairing command including identification information of the radio remote controller, and a remote control mode for transmitting the radio command; and an infrared remote controller which transmits the infrared command.

With the pairing method, the lighting device, and the lighting system according to the present disclosure, it is possible to easily perform pairing with less procedure in installation work of a lighting system including a plurality of lighting devices and a radio remote controller.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 1 is a block diagram illustrating a configuration example of a lighting system according to Embodiment 1;

DETAILED DESCRIPTION OF THE EMBODIMENTS

Figure 2A:
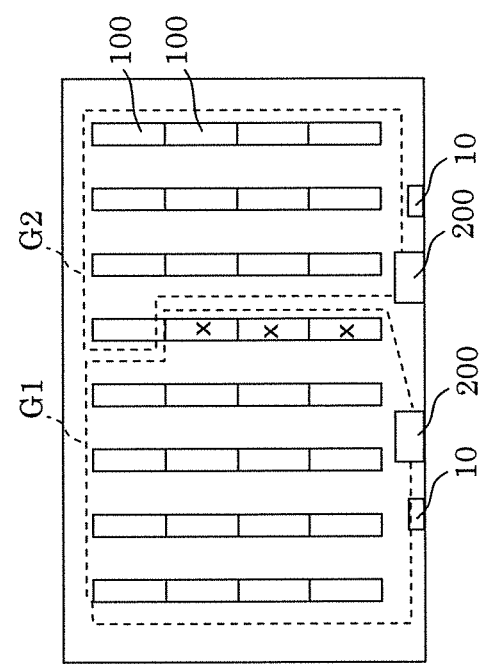
FIG. 2A is a schematic diagram illustrating an installation example of the lighting system according to Embodiment 1.

The following describes in detail embodiments according to the present disclosure, with reference to the drawings. It should be noted that each of the embodiments explained below describes a specific example of the present disclosure. The numerical values, shapes, materials, structural components, the disposition and connection of the structural components, steps, the processing order of the steps, etc. described in the following embodiments are mere examples, and do not intend to limit the present disclosure. Furthermore, among the structural components in the following embodiments, structural components not recited in any one of the independent claims which indicate the broadest concepts of the present disclosure are described as arbitrary structural components. Moreover, each diagram is a schematic diagram and not necessarily strictly illustrated.

Embodiment 1

The following describes a lighting system according to the present embodiment, with reference to the drawings.

1.1 A Configuration Example of a Lighting System

FIG. 1 is a block diagram illustrating a configuration example of a lighting system according to Embodiment 1. The lighting system illustrated in the diagram includes switch 10, a plurality of lighting devices 100; radio remote controller 200; and infrared remote controller 300.

Switch 10 is, as it is called, a wall switch which switches between conduction and non-conduction of AC power lines connected to lighting devices 100. The diagram illustrates only one switch 10, and one switch 10 is provided per five lighting devices 100, for example.

Turning on and off of lighting devices 100 is controlled by switch 10, and lighting devices 100 are further controlled by a remote controller, e.g., radio remote controller 200 and infrared remote controller 300. Radio remote controller 200 and lighting devices 100 need to be paired in order to control lighting devices 100 by radio remote controller 200. For the pairing, it is necessary for lighting devices 100 to store identification information of radio remote controller 200 serving as a master device. With this, radio remote controller 200 serving as the master device is associated with lighting devices 100, which are slave devices controlled by the master device. The above-described identification information is, for example, an address of radio remote controller 200. Lighting device 100 which is paired operates according to a radio command including the identification information of the master device. Since the master device is unknown to lighting device 100 which is not paired, lighting device 100 which is not paired ignores the radio command. It should be noted that, although at least identification information of the master device need to be stored in lighting device 100 for pairing, identification information, device type information, etc., of lighting device 100 may further be stored by radio remote controller 200.

When lighting device 100 is in an initial state at power on, lighting device 100 operates in a pairing configuration mode for storing the identification information of radio remote controller 200 serving as the master device. According to the present embodiment, the pairing configuration mode includes two types of pairing configuration mode, a simple configuration mode and a manual configuration mode. Lighting device 100 operates in the simple configuration mode when lighting device 100 is in initial state 1 at power on, and operates in the manual configuration mode when lighting device 100 is in initial state 2 at power on.

Initial state 1 is an electrically factory default state of lighting device 100. More specifically, initial state 1 is a state in which identification information of radio remote controller 200 serving as a master device is not stored, and further, other setting data items (data indicating a current dimming level, data indicating a toning level, etc.,) have also been reset to initial values.

In addition, initial state 2 is a state in which identification information of radio remote controller 200 serving as a master device is not stored. For example, when paired lighting device 100 is unpaired, lighting device 100 enters initial state 2.

In addition, instead of shifting between the simple configuration mode and manual configuration mode according to whether lighting device 100 is in initial state 1 or initial state 2, lighting device 100 may shift between the simple configuration mode and the manual configuration mode according to time elapsed after lighting device 100 is powered on. More specifically, lighting device 100 may be in the simple configuration mode for a certain period of time after lighting device 100 is powered on and in the manual configuration mode for a following certain period of time. This certain period of time may be several seconds or approximately one minute, for example. When pairing is not configured in lighting device 100 in neither the simple configuration mode nor the manual configuration mode, lighting device 100 may shift from the simple configuration mode to the manual configuration mode when lighting device 100 is powered on next time.

In the simple configuration mode, when lighting device 100 is in initial state 1 at power on, lighting device 100 stores, immediately upon receiving a pairing command from radio remote controller 200, identification information included in the pairing command as identification information of radio remote controller 200 serving as a master device.

In the manual configuration mode, when lighting device 100 is in initial state 2 at power on, lighting device 100 stores identification information included in a pairing command as identification information of radio remote controller 200 serving as a master device, when receiving the pairing command from radio remote controller 200 and further receiving a pairing trigger signal from another remote controller, e.g., infrared remote controller 300. In other words, when lighting device 100 which is in initial state 2 at power on receives a pairing command from radio remote controller 200, lighting device 100 suspends storing of identification information included in the pairing command as identification information of radio remote controller 200 serving as a master device, until lighting device 100 receives a pairing trigger signal from infrared remote controller 300.

Radio remote controller 200 is a remote controller which controls paired lighting device 100 using a radio command. When a user operation for instructing start of the pairing configuration mode is carried out, such as when a configuration mode button is pressed, radio remote controller 200 repeatedly transmits on a temporary basis a pairing command including identification information of radio remote controller 200. The temporary basis may indicate, for example, five minutes, 10 minutes, etc., or may indicate a period of time before a user operation for instructing end of the pairing configuration mode is carried out, such as when the above-described configuration mode button is pressed.

Infrared remote controller 300 is a remote controller which controls lighting device 100, using an infrared command. Infrared remote controller 300 is not necessary in the above-described simple configuration mode. On the other hand, infrared remote controller 300 is used in the manual configuration mode for transmitting a pairing trigger signal to lighting device 100 which is a target of pairing. It should be noted that, although principally not capable of controlling lighting device 100 that is paired, infrared remote controller 300 is capable of controlling lighting device 100 that is not paired.

1.2 An Arrangement Example of the Lighting System

The following describes an arrangement example of the lighting system.

FIG. 2A is a schematic diagram illustrating an installation example of the lighting system according to Embodiment 1. FIG. 2A illustrates: 32 lighting devices 100 installed on a ceiling of a room, a store, etc.; two radio remote controls 200 installed on a wall; and two switches 10. Frames of dashed lines indicate groups of lighting devices 100. Group G1 includes 16 lighting devices 100 on the left side, and three lighting devices 100 each assigned with sign "x". Group G2 includes 13 lighting devices 100 resulting from excluding the three lighting devices 100 each assigned with sign "x" from 16 lighting devices 100 on the right side.

Switch 10 on the left side corresponds to the 16 lighting devices 100 on the left side, and switch 10 on the right side corresponds to the 16 lighting devices 100 on the right side. In this case, groups G1 and G2 are not in complete correspondence with the two switches 10.

In the installation work of the lighting system, none of lighting devices 100 immediately after the installation is paired with radio remote controller 200. In addition, each of lighting devices 100 is in an electrically factory default state. Pairing for the above-described groups G1 and G2 can be carried out in the following procedure, for example.

(1-1) First, radio remote controller 200 on the left side and the 16 lighting devices 100 on the left side are paired in the simple configuration mode. (1-2) Radio remote controller 200 on the right side and the 16 lighting devices 100 on the right side are paired in the simple configuration mode. (1-3) Each of the three lighting devices 100 assigned with sign "x" is unpaired. (1-4) Pairing of the three lighting devices 100 assigned with sign "x" is carried out in the manual configuration mode.

Alternatively, pairing can be carried out in the following procedure, for example.

(2-1) Radio remote controller 200 on the right side and the 16 lighting devices 100 on the right side are paired in the simple configuration mode. (2-2) Each of the three lighting devices 100 assigned with sign "x" is unpaired. (2-3) Pairing of the 16 lighting devices 100 on the left side and the three lighting devices 100 assigned with sign "x" is carried out in the manual configuration mode.

In the above-described two examples, a user (installation worker) can easily perform pairing in the simple configuration mode by simply operating switch 10 and radio remote controller 200. In the manual configuration mode, it is possible to easily perform pairing by simply operating switch 10, radio remote controller 200, and infrared remote controller 300. Furthermore, it is possible to easily unpair the pairing by simply operating infrared remote controller 300. In other words, a user need not directly operate lighting devices 100 placed at a high position (i.e., a ceiling) one by one, and can easily perform pairing.

Figure 2B:
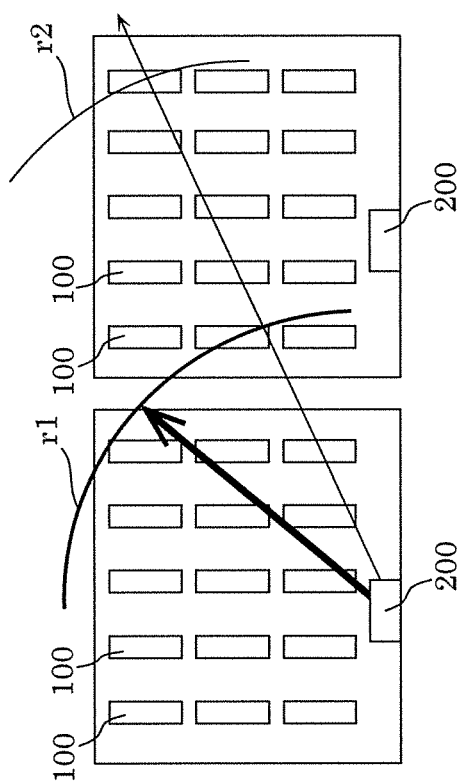
FIG. 2B is a schematic diagram illustrating another installation example of the lighting system according to Embodiment 1.

FIG. 2B is a schematic diagram illustrating another installation example of the lighting system according to Embodiment 1. FIG. 2B illustrates a lighting system installed in two adjacent rooms, stores, or the like. In the room or store on the left side, 15 lighting devices 100 and radio remote controller 200 are placed. Likewise, in the room or store on the right side, 15 lighting devices 100 and radio remote controller 200 are placed. Circular arcs in the diagram each indicate a range of radio waves transmitted by radio remote controller 200 on the left side. Bold circular arc r1 indicates a rated range of radio waves. In some cases, an actual range of radio waves exceeds the rated range of radio waves represented by circular arc r1, according to the positional relation and the placement situation of radio remote controller 200 and lighting devices 100. For example, a radio wave of radio remote controller 200 on the left side sometimes reaches circular arc r2 which includes the adjacent room or store. There are cases where installation work for lighting systems are concurrently carried out in adjacent rooms or stores in a new building, and sometimes lighting device 100 in the room or store on the right side in the diagram accidentally receives a pairing command transmitted from radio remote controller 200 on the left side, for example, and pairing is falsely carried out. When pairing is falsely carried out on lighting device 100 according to the present embodiment, it is possible to easily unpair the pairing using an unpairing signal transmitted from infrared remote controller 300. In other words, it is possible to easily unpair false pairing of lighting device 100 without a direct operation by a user.

1.3 A Configuration Example of the Lighting System

The following describes a specific configuration of lighting device 100.

Figure 3:
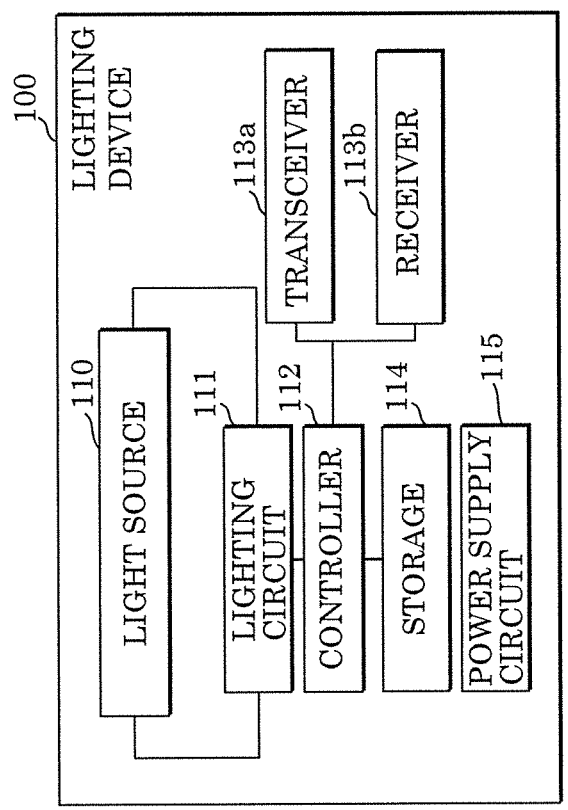
FIG. 3 is a block diagram illustrating a configuration example of a lighting device according to Embodiment 1.

FIG. 3 is a block diagram illustrating a configuration example of lighting device 100 according to Embodiment 1. As illustrated in FIG. 3, lighting device 100 includes: light source 110; lighting circuit 111; controller 112; communicator 113; storage 114; and power supply circuit 115.

Light source 110 includes at least one light-emitting element. The at least one light-emitting element is, for example, a plurality of light-emitting diode (LED) elements. It should be noted that the at least one light-emitting element is not limited to the LED element. Light source 110 may include, for example, a semiconductor light-emitting element such as a semiconductor laser, or a solid-state light-emitting element such as an organic electro luminescence (EL) and an inorganic EL. In addition, light source 110 may be a straight-tube type as in lighting device 100 illustrated in FIG. 2A and FIG. 2B, a ring-shape fluorescent lamp, or a downlight.

Lighting circuit 111 supplies light source 110 with a voltage or current for lighting, blinking, turning off, etc., of light source 110. The voltage or current differs according to, for example, an illumination mode such as a dimming ratio and a toning ratio when light source 110 includes a plurality of LED elements.

Controller 112 controls lighting circuit 111 according to a plurality of illumination modes. In addition, controller 112 controls, for example, a dimming function for adjusting brightness, a toning function for adjusting a color temperature, a fading function for adjusting brightness with time, etc. Controller 112 responds to a radio command and an infrared command which are received from radio remote controller 200 and infrared remote controller 300 via transceiver 113a and receiver 113b.

Furthermore, controller 112 determines, at power on, whether or not lighting device 100 is in an initial state in which, for example, identification information of a master device is not stored in storage 114, and lighting device 100 enters a pairing configuration mode when controller 112 determines that lighting device 100 is in the initial state. When a pairing command including identification information of radio remote controller 200 is received in the pairing configuration mode, controller 112 stores the identification information into storage 114. After the identification information of radio remote controller 200 serving as the master device is stored, controller 112 causes lighting device 100 to operate according to a radio command including the identification information.

In the above-described pairing configuration mode, however, controller 112 selects either one of the simple configuration mode and the manual configuration mode as the pairing configuration mode according to the state of lighting device 100. Then, controller 112 stores the identification information into storage 114 immediately when a pairing command is received in the simple configuration mode, and suspends storing of the identification information after a pairing command is received in the manual configuration mode, until a pairing trigger signal from infrared remote controller 300 is received.

It should be noted that controller 112, in the pairing configuration mode, may not only store identification information in Step S75, but also transmit a response signal including identification information of lighting device 100 to radio remote controller 200 serving as the master device.

Transceiver 113a receives a radio command from radio remote controller 200. The radio command includes, for example, the above-described pairing command and a radio command for instructing dimming, toning, etc. It should be noted that controller 114 may be an IC, or may include a microprocessor and a program memory.

Receiver 113b receives an infrared command, a pairing trigger signal, and an unpairing signal from infrared remote controller 300.

Storage 114 stores: identification information of radio remote controller 200 serving as the master device; data indicating a current dimming level; data indicating a current toning level; device information of lighting device 100; a flag or the like that indicates a state; etc. However, identification information is an invalid value and other data items each indicate a default value, in an electrically factory default state. The flag or the like that indicates a state may include a flag indicating whether or not lighting device 100 is in an electrically factory default state, and a flag indicating that identification information is valid or invalid.

Power supply circuit 115 supplies power to each component in lighting device 100.

With this, it is possible to easily perform pairing in the simple configuration mode without requiring a pairing trigger signal from infrared remote controller 300. In addition, it is possible to reliably perform pairing in the manual configuration mode selectively on lighting device 100 which has received a pairing trigger signal from infrared remote controller 300, from among a plurality of lighting devices 100. Furthermore, it is possible to perform pairing on lighting device 100 without a direct operation by a user in any of the simple configuration mode and the manual configuration mode.

1.4 A Configuration Example of the Radio Remote Controller

Figure 4:
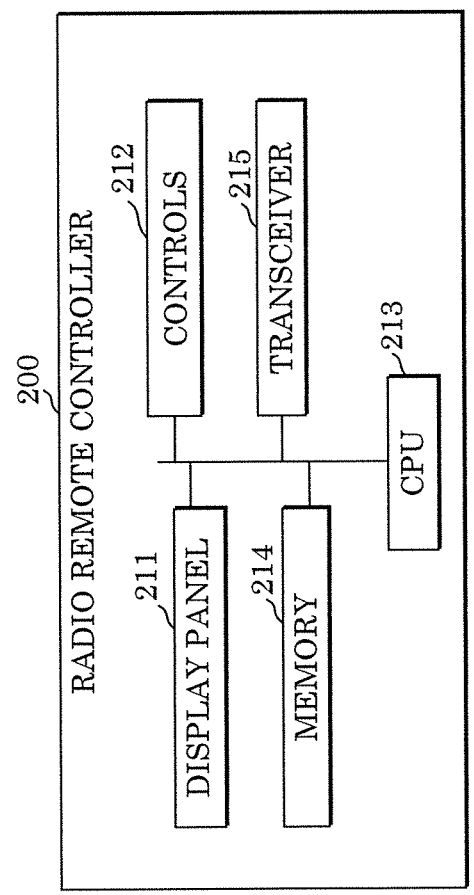
FIG. 4 is a block diagram illustrating a configuration example of a radio remote controller according to Embodiment 1.

FIG. 4 is a block diagram illustrating a configuration example of radio remote controller 200 according to Embodiment 1. As illustrated in the diagram, radio remote controller 200 includes: display panel 211; controls 212, CPU 213, memory 214, and transceiver 215.

Display panel 211 is, for example, a liquid crystal display panel, and displays a current state such as an operation mode, a lighting state, and time.

Controls 212 include a plurality of control buttons. The plurality of control buttons include: a configuration mode button for instructing start or end of the pairing configuration mode; an up button for increasing a dimming level; a down button for decreasing the dimming level, etc.

CPU 213 controls operation of radio remote controller 200 and transmission of a radio command, by executing a program stored in memory 214. More specifically, CPU 213 controls lighting device 100 by transmitting a radio command via transceiver 215 to lighting device 100, according to a user operation performed using controls 212. For example, when the configuration mode button is pressed by a user, CPU 213 repeatedly transmits via transceiver 215 on a temporary basis a pairing command including identification information of radio remote controller 200. Several hundred mS, for example, 0.5 seconds are sufficient for the period of repeating transmission. In addition, the temporary basis may indicate a fixed period of time, for example, five minutes, 10 minutes, etc., or a period of time before a user performs an operation for instructing end of the pairing configuration mode, for example, a period of time before a user presses the configuration mode button as described above.

Memory 214 stores a program executed by CPU 213 and data. In addition, when receiving a response signal including identification information of lighting device 100 transmitted by lighting device 100 in the pairing configuration mode, memory 214 stores the identification information of lighting device 100 as the pairing information.

Transceiver 215 transmits and receives a radio command according to control by CPU 213.

As described above, when pairing is performed in installation work of lighting device 100, a user simply presses the configuration mode button of radio remote controller 200 for entering the pairing configuration mode. More specifically, in the simple configuration mode, it is possible to perform paring by simply turning ON switch 10 and turning ON the configuration mode button of radio remote controller 200.

1.5 A Configuration Example of the Infrared Remote Control

Figure 5:
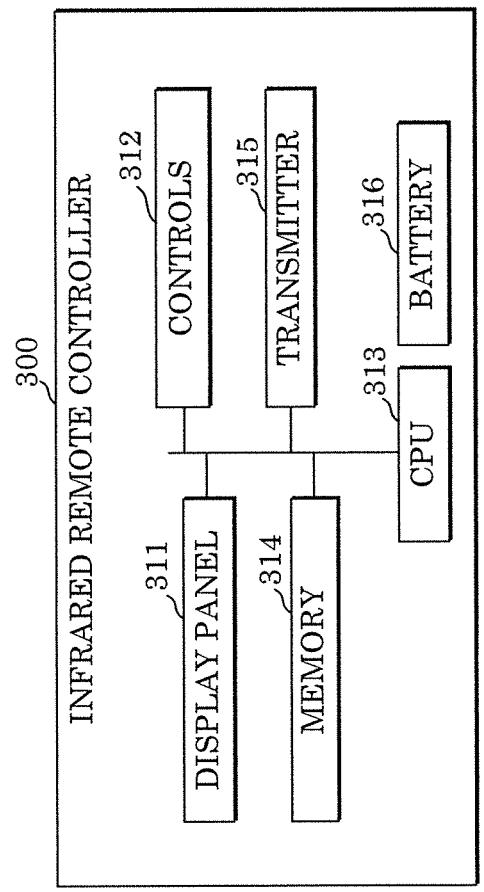
FIG. 5 is a block diagram illustrating a configuration example of an infrared remote controller according to Embodiment 1.

FIG. 5 is a block diagram illustrating a configuration example of infrared remote controller 300 according to Embodiment 1. As illustrated in the diagram, infrared remote controller 300 includes: display panel 311; controls 312, CPU 313, memory 314, transmitter 315, and battery 316.

Display panel 311 is, for example, a liquid crystal display panel, and displays a current state such as an operation mode, a lighting state, and time.

Controls 312 include a plurality of control buttons. The plurality of control buttons includes: a pairing trigger button, an unpairing button, an ON button, an OFF button, etc. The pairing trigger button is for transmitting a pairing trigger signal. The unpairing button is for transmitting an unpairing signal. The ON button is a button for turning on lighting device 100. The OFF button is a button for turning off lighting device 100.

CPU 313 controls operation of infrared remote controller 300 and transmission of the infrared command, the pairing trigger signal, and the unpairing signal, by executing a program stored in memory 314.

Memory 314 stores a program executed by CPU 313 and data.

Transmitter 315 is, for example, an infrared light-emitting element such as an infrared LED, and transmits the infrared command, the pairing trigger signal, and the unpairing signal, according to control by CPU 313. Light distribution of infrared light by infrared remote controller 300 is set narrowly to avoid concurrent reception by adjacent lighting devices 100. For example, the light distribution of infrared light is set such that, when a user operates infrared remote controller 300 in the vicinity of target lighting device 100 to transmit an infrared signal toward the target lighting device 100, other lighting devices 100 in the neighborhood cannot receive the infrared signal transmitted from infrared remote controller 300. In other words, infrared remote controller 300 is capable of individual transmission to the respective lighting devices 100.

Battery 316 supplies power to infrared remote controller 300.

2.1 An Operation Example of Pairing of the Lighting System

The following describes operations of the lighting system configured as described above according to the present embodiment.

First, operations in the pairing configuration mode performed by radio remote controller 200 shall be described.

Figure 6:
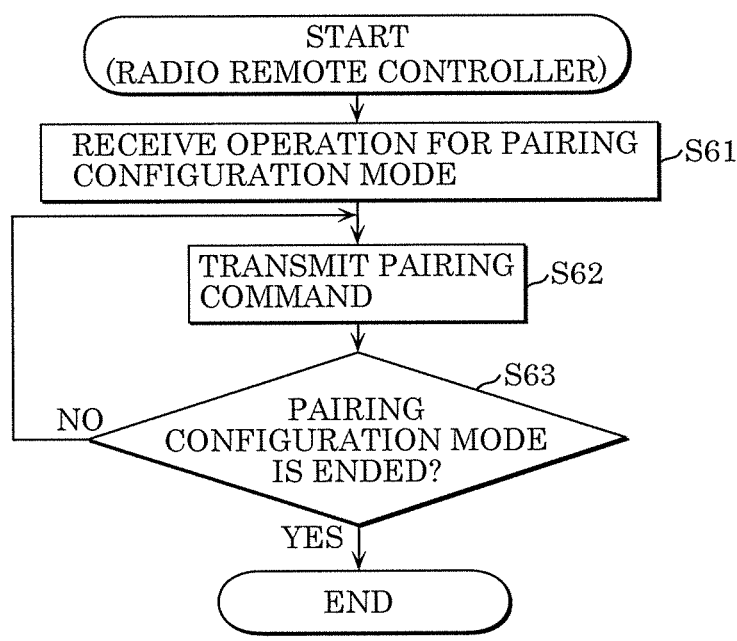
FIG. 6 is a flowchart illustrating a processing example of a pairing configuration mode of the radio remote controller according to Embodiment 1.

FIG. 6 is a flowchart illustrating a processing example of the paring configuration mode of radio remote controller 200 according to Embodiment 1.

A user performs an operation for starting the pairing configuration mode on radio remote controller 200 which is to serve as the master device. Here, the operation for starting the pairing configuration mode is pressing of the configuration mode button.

When receiving the operation for starting the pairing configuration mode (S61), radio remote controller 200 repeatedly transmits, on a temporary basis, a pairing command including identification information of radio remote controller 200 (S62 and S63). For example, a broadcast address is set to the pairing command as a destination. In step S63, end of the operation may be determined, for example, when 10 minutes have elapsed or when the configuration mode button is pressed by a user, or both of the conditions may be judged and end of the operation may be determined when one of such conditions is satisfied.

As described above, it is possible for a user to easily set the pairing configuration mode by simply pressing the configuration mode button of radio remote controller 200.

Next, a pairing operation of lighting device 100 shall be described.

Figure 7:
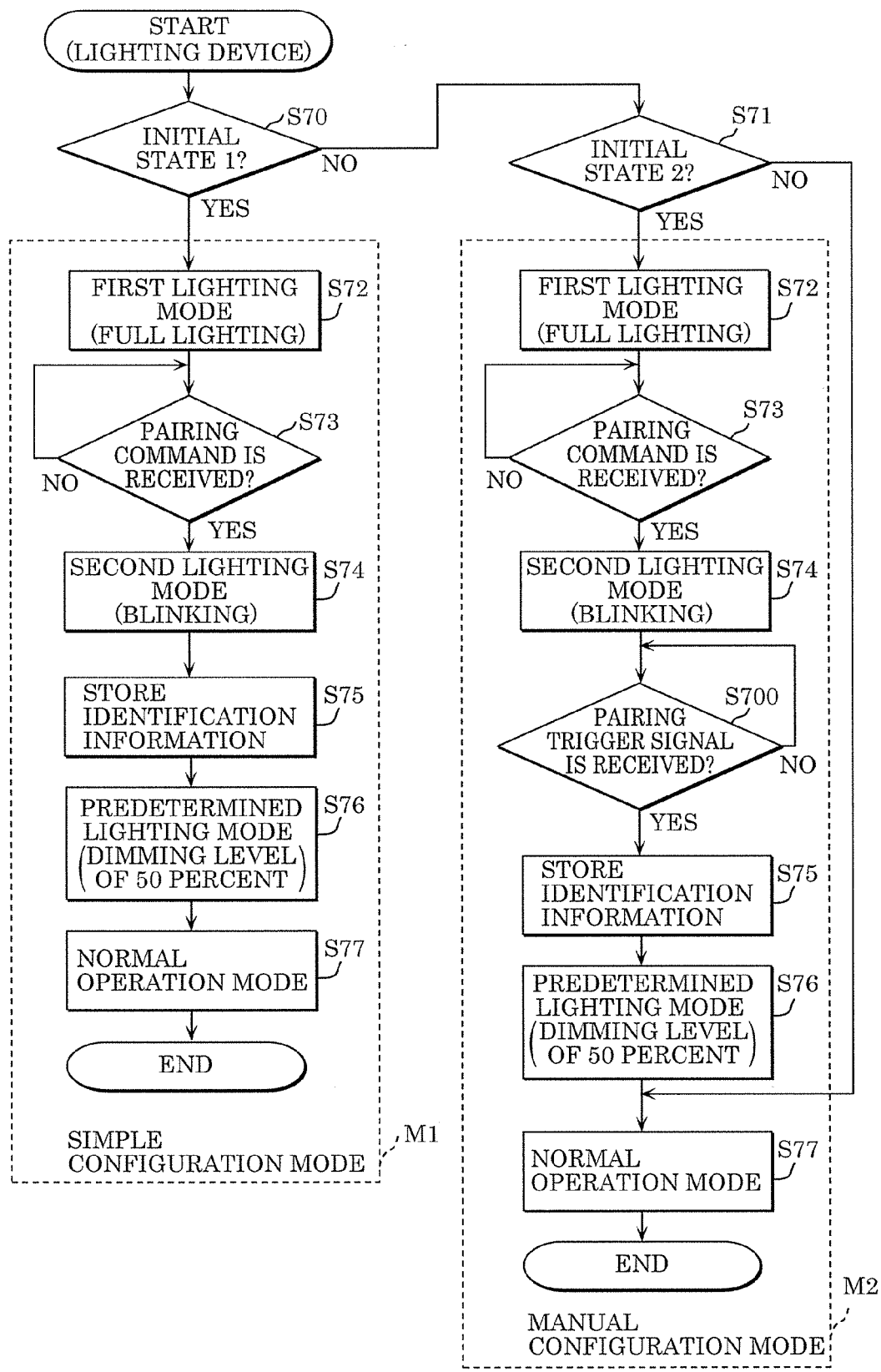
FIG. 7 is a flowchart illustrating a processing example when the lighting device is powered on, according to Embodiment 1.

FIG. 7 is a flowchart illustrating a processing example when lighting device 100 is powered on according to Embodiment 1.

A user turns on switch 10 which corresponds to lighting device 100 that is a target of pairing.

It is determined whether or not lighting device 100 is in initial state 1 at power on, i.e., in an electrically factory default state. When it is determined that lighting device 100 is in initial state 1 (yes in S70), lighting device 100 enters simple configuration mode M1. When it is determined that lighting device 100 is not in initial state 1 (no in S70), it is determined whether or not lighting device 100 is in initial state 2; that is, whether or not identification information of the master device is stored in lighting device 100. In addition, when it is determined that lighting device 100 is in initial state 2 (yes in S71), lighting device 100 enters manual configuration mode M2. When it is determined that lighting device 100 is not in initial state 2 (no in S71), lighting device 100 enters a normal operation mode.

For example, when lighting device 100 is powered on using switch 10 for the first time after the lighting system is installed in a room or a store, lighting device 100 enters simple configuration mode Ml. Furthermore, when paired lighting device 100 is unpaired, lighting device 100 enters manual configuration mode M2 at power on.

First, simple configuration mode M1 shall be described.

In simple configuration mode M1, lighting device 100 is turned on in the first illumination mode (for example, a full lighting state, i.e., at a dimming level of 100 percent) (S72). When a pairing command is received from radio remote controller 200 (S73), lighting device 100 is turned on in the second illumination mode (for example, a blinking state, at a slightly low lighting level, etc.) (S74). S74 may be skipped.

This allows a user (i.e., installation worker) in installation work of the lighting system including a plurality of lighting devices 100 and radio remote controller 200 to distinguish between lighting device 100 that is paired and lighting device 100 that is not paired at power on, and further to determine whether or not a pairing command has been received. With this, it is possible for the user to reliably check progress of the installation work of the lighting system.

In addition, lighting device 100 which has received a pairing command stores identification information included in the received pairing command as identification information of a master device (S75), emits light in a predetermined illumination mode (for example, at a dimming level of 50 percent) (S76), and enters an operation mode in which lighting device 100 operates according to a radio command including the identification information of the master device.

As described above, with simple configuration mode M1, it is possible to easily perform paring with less procedure in installation work of the lighting system including a plurality of lighting devices 100 and radio remote controller 200. More specifically, it is possible for a user to perform pairing of lighting device 100 corresponding to switch 10 with radio remote controller 200, by simply pressing a configuration mode button of radio remote controller 200 and turning on switch 10.

Next, manual configuration mode M2 shall be described.

When it is determined in step S71 that lighting device 100 is in initial state 2, lighting device 100 enters manual configuration mode M2. As illustrated in FIG. 7, manual configuration mode M2 differs from simple configuration mode M1 in that step S700 is added between step S74 and step S75. The following description focuses on the differences.

In manual configuration mode M2, lighting device 100 suspends storing of identification information after a pairing command is received until lighting device 100 receives a pairing trigger signal from infrared remote controller 300;

that is, lighting device 100 determines whether or not a pairing trigger signal is received, and stores the identification information when it is determined that the pairing trigger signal is received (S700). As described above, in manual configuration mode M2, it is possible to selectively perform pairing of desired one of the plurality of lighting devices 100 corresponding to switch 10. In other words, it is possible to reliably perform pairing in the manual configuration mode selectively, from among a plurality of lighting devices 100, on lighting device 100 which has received a pairing trigger signal from infrared remote controller 300.

2.2 An Example of a Command Receive Process of the Lighting System

Next, a command receive process of lighting device 100 shall be described.

Figure 8:
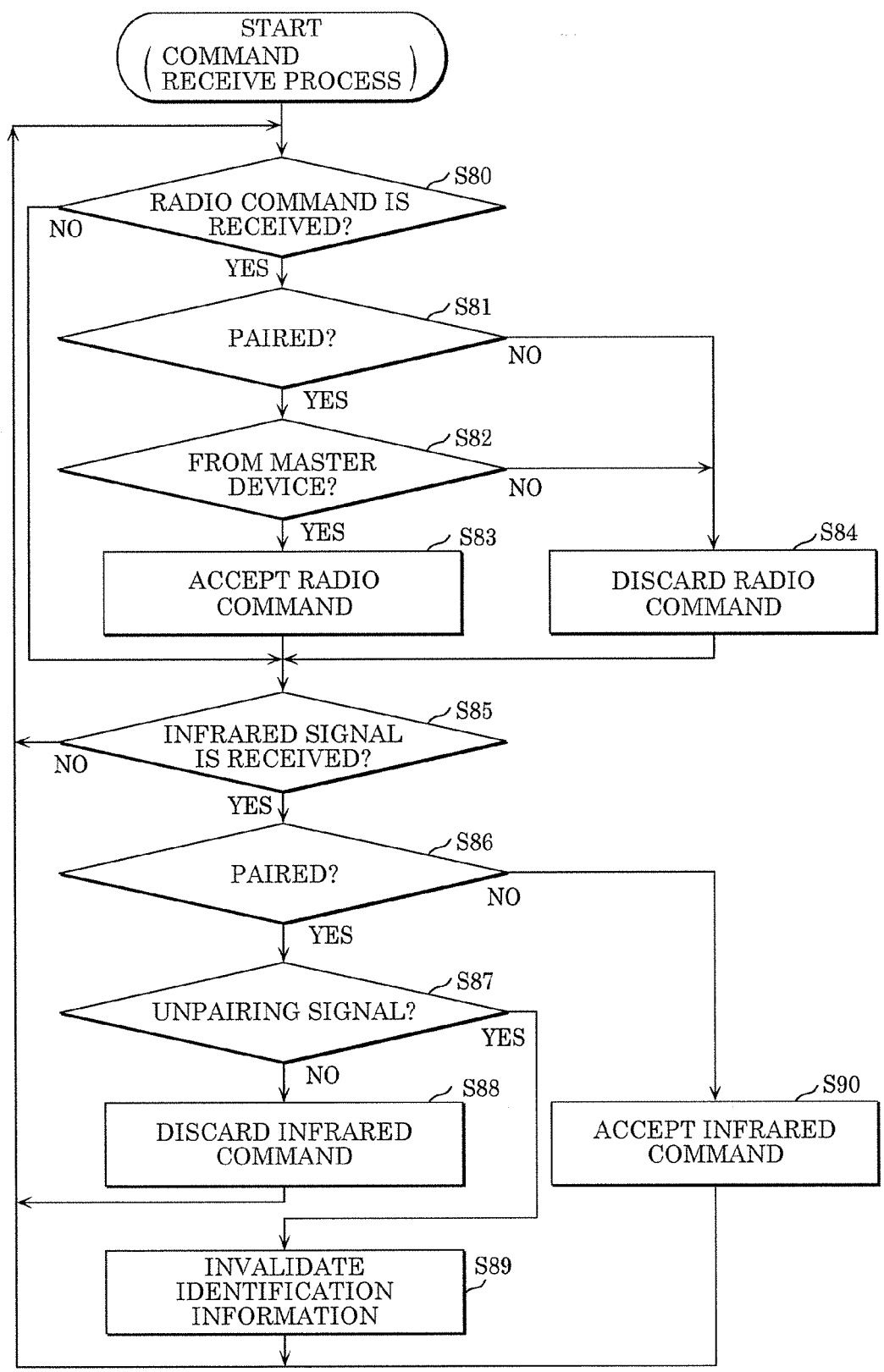
FIG. 8 is a flowchart illustrating an example of a command receive process of the lighting device according to Embodiment 1.

FIG. 8 is a flowchart illustrating an example of a command receive process of lighting device 100 according to Embodiment 1.

When lighting device 100 receives a radio command (yes in S80), lighting device 100 determines whether or not lighting device 100 has already been paired, and whether or not the radio command is a radio command transmitted from the master device (S81 and S82). When it is determined that lighting device 100 has already been paired (yes in S81) and that the radio command is a radio command transmitted from radio remote controller 200 serving as the master device (yes in S82), lighting device 100 accepts the radio command (S83). On the other hand, when it is determined that lighting device 100 has not been paired (no in S81), lighting device 100 discards the radio command. In addition, when it is determined that the radio command is not a radio command transmitted from the master device (no in S82), lighting device 100 discards the radio command (S84).

Furthermore, when an infrared signal is received (yes in S85), lighting device 100 determines whether or not lighting device 100 has already been paired (S86). When it is determined that lighting device 100 has already been paired, lighting device 100 further determines whether or not the infrared signal is an unpairing signal (S87).

When it is determined that lighting device 100 has already been paired (yes in S86) and that the infrared signal is not an unpairing signal (no in S87), lighting device 100 discards the infrared command (an infrared command in this case) (S88). When it is determined that the infrared signal is an unpairing signal (yes in S87), lighting device 100 invalidates the identification information (S89). On the other hand, when it is determined that lighting device 100 has not been paired (no in S86), lighting device 100 accepts the infrared signal (S90).

Lighting device 100 accepts the radio command (S83). Lighting device 100 discards the radio command (S84) in both cases where lighting device 100 has not been paired (no in S81) and where the radio command is not transmitted from the master device (no in S82).

As described above, both of the paired and not paired lighting devices 100 are easily controllable in the lighting system including a plurality of lighting devices 100 and radio remote controller 200. More specifically, lighting device 100 that is not paired with radio remote controller 200 is controllable by infrared remote controller 300.

For example, when lighting device 100 that is not paired is detected in installation work of the lighting system, although radio remote controller 200 is not capable of controlling lighting device 100 that is not paired, control including turning on and off of lighting device 100 that is not paired can be carried out by infrared remote controller 300. In addition, for example, when a corner of a room is used as a meeting space or the like, it is possible, using infrared remote controller 300, to turn on light of the corner when meeting is held and turn off light of the corner when meeting is not held, by unpairing corresponding lighting devices 100 and remove control of radio remote controller 200.

As described above, with the pairing method, the lighting device, and the lighting system according to the present embodiment, it is possible to easily perform pairing with less procedure in the lighting system including a plurality of lighting devices 100 and radio remote controller 200.

It should be noted that, when a response signal including the identification information of lighting device 100 is transmitted to radio remote controller 200 in Step S75, radio remote controller 200 may individually control one by one lighting devices 100 that are paired. For example, radio remote controller 200 may transmit a radio command for instructing unpairing.

Embodiment 2

The following describes a lighting system according to Embodiment 2. In Embodiment 1, the case has been described where lighting device 100 enters the simple configuration mode when lighting device 100 is in initial state 1 at power on, and enters the manual configuration mode when lighting device 100 is in initial state 2 at power on. In contrast, the present embodiment describes a lighting system in which a pairing command is either one of a simple configuration command and a manual configuration command, and selection between the simple configuration mode and the manual configuration mode is performed based on the pairing command transmitted from radio remote controller 200.

The lighting system according to the present embodiment has a configuration substantially same as the configuration illustrated in the block diagrams of FIG. 1, FIG. 3, FIG. 4, and FIG. 5. The lighting system according to the present embodiment differs from the lighting system according to Embodiment 1 in that the pairing command is either one of the simple setting command and the manual setting command, and in operations corresponding to these commands. The following description focuses on the differences.

Figure 9:
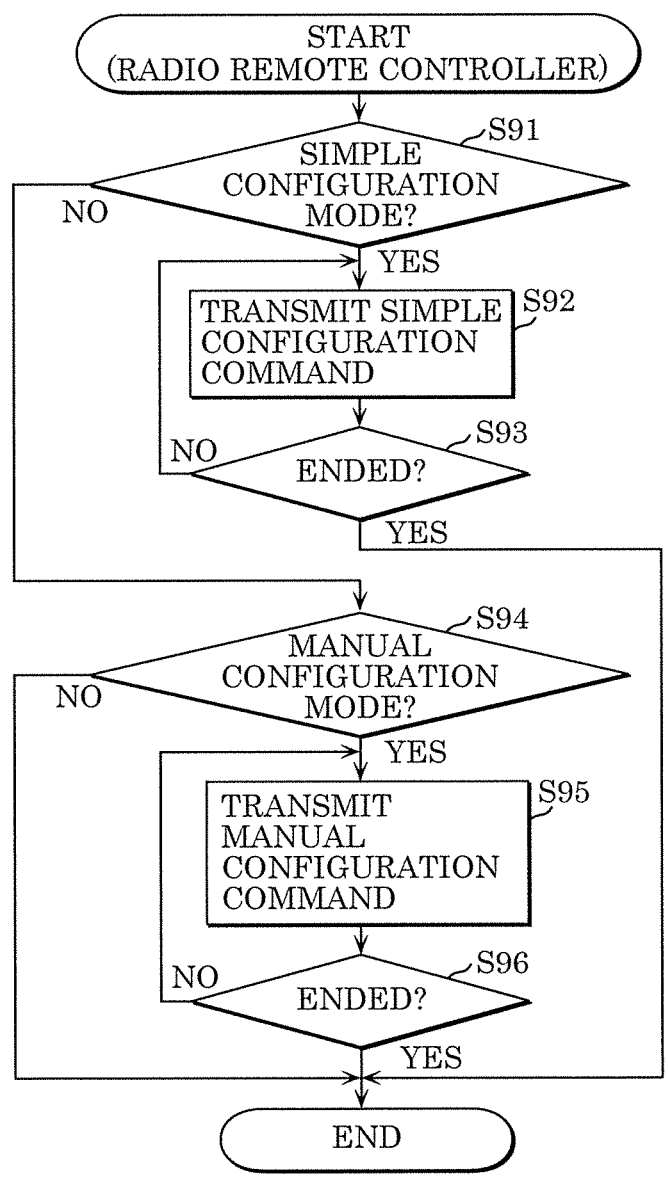
FIG. 9 is a flowchart illustrating a processing example of a pairing configuration mode of a radio remote controller according to Embodiment 2.

FIG. 9 is a flowchart illustrating a processing example of the paring setting mode performed by radio remote controller 200 according to Embodiment 2.

A user performs an operation for starting the pairing setting mode on radio remote controller 200 which is to serve as the master device. An operation for starting the simple configuration mode is, for example, pressing of the simple configuration mode button, and an operation for starting the manual configuration mode is pressing of the manual configuration mode button. It should be noted that the operation for starting the pairing configuration mode may be an operation of selecting between the simple configuration mode and the manual configuration mode from menu items displayed on display panel 211.

When receiving the operation for starting the simple configuration mode (S91), radio remote controller 200 repeatedly transmits, on a temporary basis, a simple configuration command including identification information of radio remote controller 200 as a pairing command (S92 and S93).

When receiving the operation for starting the manual configuration mode (S94), radio remote controller 200 repeatedly transmits, on a temporary basis, a manual configuration command including identification information of radio remote controller 200 as a pairing command (S95 and S96).

For example, a broadcast address is set to the above-described pairing command (simple configuration command and manual configuration command) as a destination. In step S93 and step S96, end of the operation may be determined, for example, when 10 minutes have elapsed or when the configuration mode button is pressed by a user, or both of the conditions may be judged and end of the operation may be determined when one of such conditions is satisfied.

As described above, a user can select between the simple configuration mode and the manual configuration mode as the pairing configuration mode.

Figure 10:
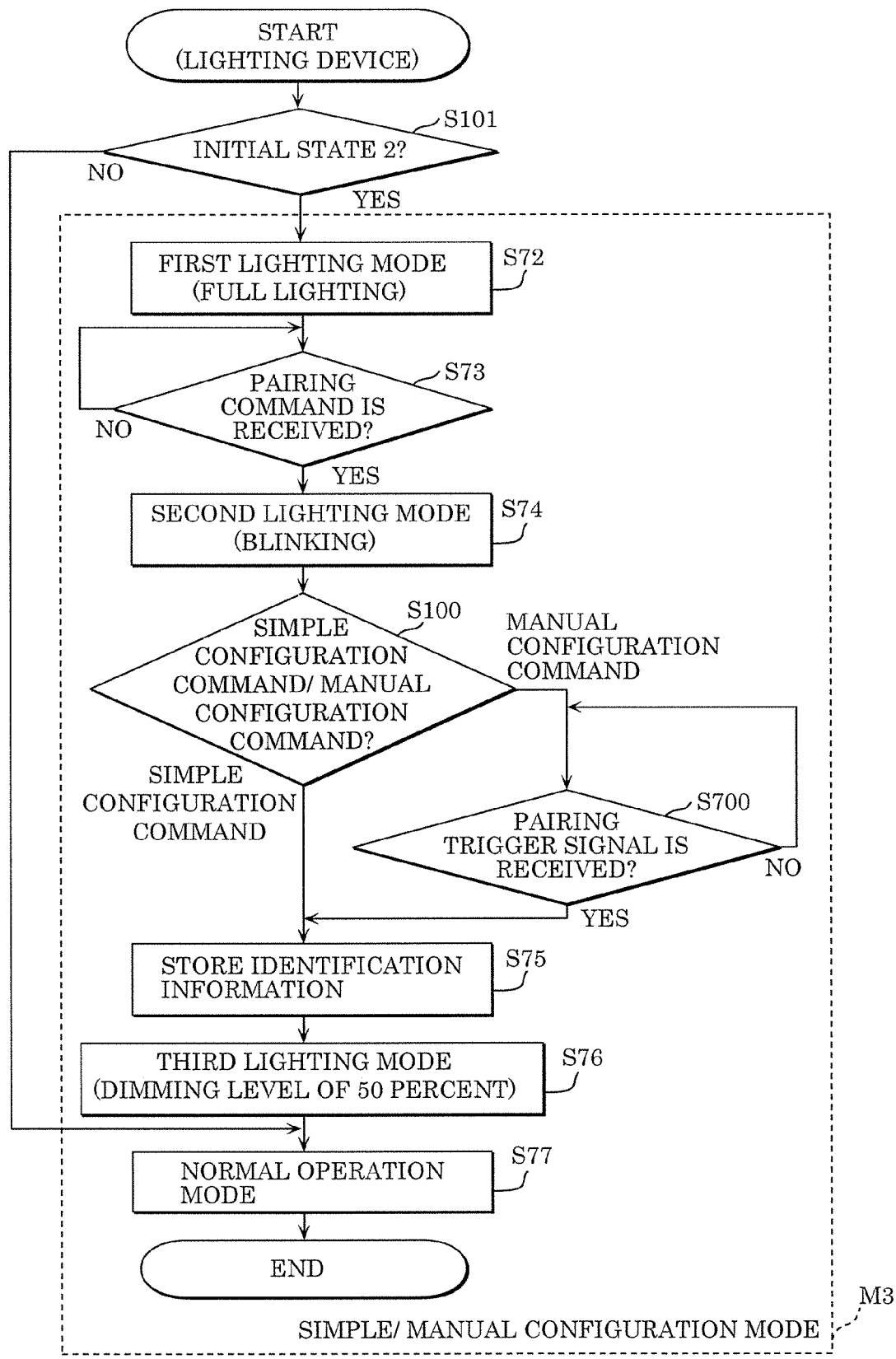
FIG. 10 is a flowchart illustrating a processing example when the lighting device is powered on, according to Embodiment 2.

FIG. 10 is a flowchart illustrating a processing example when lighting device 100 is powered on according to Embodiment 2. In FIG. 10, it is determined whether or not lighting device 100 is in initial state 2 immediately after lighting device 100 is powered on (S101). As described above, initial state 2 is a state where identification information of radio remote controller 200 serving as a master device is not stored in storage 114.

When it is determined that lighting device 100 is in initial state 2 (yes in S101), lighting device 100 enters simple/manual configuration mode M3. When it is determined that lighting device 100 is not in initial state 2 (no in S101), lighting device 100 enters a normal operation mode (S77).

Simple/manual configuration mode M3 differs from simple configuration mode M1 in FIG. 7 in that step S100 and step S700 are added between step S74 and step S75. The following description focuses on the differences.

Lighting device 100 determines whether the pairing command received in step S74 is the simple configuration command or the manual configuration command (S100).

When the pairing command is the simple configuration command (yes in S100), lighting device 100 immediately stores the identification information (S75).

When the pairing command is the manual configuration command (MANUAL CONFIGURATION COMMAND in S100), lighting device 100 suspends storing of the identification information until lighting device 10 receives a pairing trigger signal from infrared remote controller 300 (S700).

As described above, according to the pairing method, lighting device 100, and the lighting system according to the present embodiment, when the pairing command is the simple configuration command, it is possible to easily perform pairing without requiring a pairing trigger signal from infrared remote controller 300. In other words, pairing can be easily performed as the simple configuration mode.

On the other hand, when the pairing command is the manual configuration command, it is possible to selectively perform pairing of desired one of the plurality of lighting devices 100. In other words, it is possible to reliably perform pairing in the manual configuration mode selectively, from among a plurality of lighting devices 100, on lighting device 100 which has received a pairing trigger signal from infrared remote controller 300.

Furthermore, in installation work for the lighting system, it is possible for a user (installation worker) to freely select the pairing configuration mode between the simple configuration mode and the manual configuration mode, using the radio remote controller.

It should be noted that, in Embodiment 1, (a) when a pairing command is received immediately after power on (within two seconds after power on, for example), lighting device 100 may enter the simple configuration mode, and (b) in other cases (more than two seconds after power on, for example), lighting device 100 may enter the manual configuration mode. The case (a) corresponds to a case where lighting device 100 is powered on when radio remote controller 200 is in the pairing configuration mode. The case (b) corresponds to a case where radio remote controller 200 enters the pairing configuration mode after lighting device 100 is powered on (more than two seconds after power on, for example).

Also in Embodiment 2, radio remote controller 200 may transmit a pairing command (with no distinction between the simple configuration command and the manual configuration command) as with Embodiment 1, and may distinguish between the simple configuration command and the manual configuration command according to the above-described cases (a) and (b).

It should be noted that lighting device 100 may operate according to (A) and (B) described below, instead of the above-described (a) and (b). When lighting device 100 receives a pairing command, lighting device 100 may enter the simple configuration mode when (A) lighting device 100 is currently in the pairing configuration mode (i.e., waiting reception in step S73), and may enter the manual configuration mode when (B) lighting device 100 is currently not in the pairing configuration mode (i.e., a normal operation mode). In addition, the simple configuration mode and the manual configuration mode may be inversed in (A) and (B).

As described above, the pairing method according to an embodiment is a pairing method for use in a lighting system including at least one lighting device 100 serving as a slave device and radio remote controller 200 serving as a master device to control the slave device, for causing lighting device 100 to store identification information of radio remote controller 200, the method including: transmitting a pairing command repeatedly by radio remote controller 200, the pairing command including the identification information of radio remote controller 200; determining, by lighting device 100, whether or not lighting device 100 is in an initial state at power on, the initial state including a condition in which identification information of any master device is not stored in lighting device 100; if it is determined that lighting device 100 is in the initial state, storing the identification information included in the pairing command as the identification information of the master device in lighting device 100 when the paring command is received; and causing lighting device 100 in which the identification information of the master device is stored to operate according to a radio command including the identification information of the master device.

With this, it is possible to easily perform pairing with less procedure in installation work of a lighting system including a plurality of lighting devices 100 and radio remote controller 200.

Here, in the determining, lighting device 100 may emit light in a first illumination mode when lighting device 100 is determined as being in the initial state, and lighting device 100 may emit light in a second illumination mode when lighting device 100 receives the pairing command while the lighting device is determined as being in the initial state.

This allows a user (i.e., installation worker) in installation work of the lighting system including a plurality of lighting devices 100 and radio remote controller 200 to distinguish between lighting device 100 that is paired and lighting device 100 that is not paired at power on, and further to determine whether or not a pairing command is received. With this, it is possible for the user to reliably check progress of the installation operation of the lighting system.

Here, the initial state may be an electrically factory default state, and in the determining, it may be determined whether or not lighting device 100 is in the electrically factory default state, and whether or not the identification information of radio remote controller 200 serving as the master device is stored in lighting device 100. In the storing, lighting device 100 may store the identification information immediately upon receiving the pairing command if lighting device 100 is determined as being in the electrically factory default state in the determining, and lighting device 100 suspends storing of the identification information until lighting device 100 may receive a pairing trigger signal from infrared remote controller 300 after receiving the pairing command, if it is determined that lighting device 100 is in a state other than the electrically factory default state and that identification information of any master device is not stored in lighting device 100 in the determining.

With this, it is possible, when lighting device 100 is in the electrically factory default state, to easily perform pairing without requiring a pairing trigger signal from infrared remote controller 300. In other words, pairing can be easily performed in the simple configuration mode.

In contrast, when lighting device 100 is in a state other than the electrically factory default state, and identification information of a master device is not stored, it is possible to selectively perform pairing of desired one of the plurality of lighting devices 100. In other words, it is possible to reliably perform pairing in the manual setting mode selectively, from among a plurality of lighting devices 100, on lighting device 100 which has received a pairing trigger signal from infrared remote controller 300.

In addition, it is possible for lighting device 100 to enter the simple configuration mode only at power on in the electrically factory default state (for example, at first power on). It is possible for lighting device 100 to enter the manual configuration mode at power on when lighting device 100 is in a state other than the electrically factory default state and is not paired (for example, at power on after unpaired).

Here, the initial state may be a state where no identification information of a master device is stored in lighting device 100, and the pairing command may be either one of a simple configuration command and a manual configuration command. In the storing, when the pairing command is the simple configuration command, lighting device 100 determined as being in the initial state may immediately store the identification information, and when the pairing command is the manual configuration command, lighting device 100 determined as being in the initial state may suspend storing of the identification information until lighting device 100 receives a pairing trigger signal from infrared remote controller 300.

With this, it is possible, when the paring command is the simple configuration command, to easily perform pairing without requiring a pairing trigger signal from infrared remote controller 300. In other words, pairing can be easily performed in the simple configuration mode.

In contrast, when the pairing command is the manual configuration command, it is possible to selectively perform pairing of desired one of the plurality of lighting devices 100. In other words, it is possible to reliably perform pairing in the manual setting mode selectively, from among the plurality of lighting devices 100, on lighting device 100 which has received a pairing trigger signal from infrared remote controller 300.

In addition, in installation work for the lighting system, it is possible for a user (installation worker) to select the pairing configuration mode between the simple configuration mode and the manual configuration mode, using radio remote controller 200.

Here, lighting device 100 may emit light in a predetermined illumination mode when lighting device 100 stores the identification information in the storing.

This allows a user (installation worker) in installation work of the lighting system including a plurality of lighting devices 100 and radio remote controller 200 to distinguish between lighting device 100 which is properly paired and lighting device 100 which is not paired. With this, it is possible for the user to reliably check progress of the installation operation of the lighting system.

Here, the pairing method may further include invalidating the identification information stored in lighting device 100 when lighting device 100 receives an unpairing signal from infrared remote controller 300.

With this, it is possible to exclude desired lighting device 100 from control targets of radio remote controller 200. When the control targets of radio remote controller 200 are to be changed due to layout change in a room, for example, it is possible to easily unpair desired lighting device 100 by infrared remote controller 300. For example, when lighting device 100 is unexpectedly paired in the simple configuration mode, it is possible to easily unpair unexpectedly paired lighting device 100.

Here, in the causing, when lighting device 100 in which the identification information of the master device is stored receives an infrared command other than the unpairing signal from infrared remote controller 300, lighting device 100 may discard the infrared command, and when lighting device 100 in which the identification information of the master device is not stored receives an infrared command from infrared remote controller 300, lighting device 100 may operate according to the infrared command.

With this, it is possible to control lighting device 100 which is not paired with radio remote controller 200, using infrared remote controller 300.

For example, when a corner of a room is used as a meeting space or the like, it is possible, using infrared remote controller 300, to turn on light of the corner when meeting is held and turn off light of the corner when meeting is not held, by unpairing corresponding lighting device 100 and remove control of radio remote controller 200.

Here, in the storing, after storing the identification information, lighting device 100 may transmit a response signal including identification information of lighting device 100 to radio remote controller 200.

With this, radio remote controller 200 is allowed to perform individual control by transmitting identification information of paired lighting device 100 to radio remote controller 200. The identification information is, for example, an address, a model number, etc., of lighting device 100.

In addition, lighting device 100 according to the embodiment includes: transceiver 113a which receives a radio command; receiver 113b which receives infrared command; storage 114 for storing identification information of radio remote controller 200 serving as a master device; and controller 112. Controller 112 determines whether or not lighting device 100 is in an initial state at power on, the initial state including a condition in which identification information of any master device is not stored in lighting device 100. Controller 112 enters a pairing configuration mode when controller 112 determines that lighting device 100 is in the initial state, and when a pairing command including identification information of radio remote controller 200 serving as the master device is received in the pairing configuration mode, stores the identification information of radio remote controller 200 serving as the master device as the identification information of the master device to storage 114, and causes lighting device 100 to operate according to a radio command including the identification information, after storing the identification information of the master device.

With this, it is possible to easily perform pairing with less procedure in installation work of a lighting system including a plurality of lighting devices 100 and radio remote controller 200.

Here, controller 112 may select either one of a simple configuration mode and a manual configuration mode, as the pairing configuration mode, according to a state of lighting device 100, and when the pairing configuration mode is the simple configuration mode, may store the identification information to storage 114 immediately upon receiving the pairing command, and when the pairing configuration mode is the manual configuration mode, may suspend storing of the identification information until lighting device 100 receives a pairing trigger signal from infrared remote controller 300 after receiving the pairing command.

With this, it is possible to easily perform pairing in the simple configuration mode without requiring a pairing trigger signal from infrared remote controller 300.

In addition, it is possible to reliably perform pairing in the manual setting mode selectively, from among the plurality of lighting devices 100, on lighting device 100 which has received a pairing trigger signal from infrared remote controller 300.

Here, controller 112 may determine whether or not lighting device 100 is in an electrically factory default state, and whether or not the identification information of radio remote controller 200 serving as the master device is stored in lighting device 100, may select the simple configuration mode when controller 112 determines that lighting device 100 is in the electrically factory default state, and may select the manual configuration mode when controller 112 determines that lighting device 100 is in a state other than the electrically factory default state and that the identification information of the master device is not stored in lighting device 100.

With this, when lighting device 100 is in the electrically factory default state, it is possible to easily perform pairing in the simple configuration mode.

In contrast, when lighting device 100 is in a state other than the electrically factory default state and identification information of a master device is not stored in lighting device 100, it is possible to reliably perform pairing in the manual setting mode selectively, from among the plurality of lighting devices 100, on lighting device 100 which has received a pairing trigger signal from infrared remote controller 300.

In addition, it is possible for lighting device 100 to enter the simple configuration mode only at power on in the electrically factory default state (for example, at first power on). It is possible for lighting device 100 to enter the manual configuration mode at power on when lighting device 100 is in a state other than the electrically factory default state and is not paired (for example, at power on after unpaired).

Here, controller 112 may select either one of the simple configuration mode and the manual configuration mode, as the pairing configuration mode, according to the pairing command.

With this, when the pairing command is a simple configuration command, it is possible to easily perform pairing without requiring a pairing trigger signal from infrared remote controller 300. In other words, pairing can be easily performed in the simple configuration mode.

In contrast, when the pairing command is a manual configuration command, it is possible to selectively perform pairing of desired one of the plurality of lighting devices 100. In other words, it is possible to reliably perform pairing in the manual setting mode selectively, from among the plurality of lighting devices 100, on lighting device 100 which has received a pairing trigger signal from infrared remote controller 300.

In addition, in installation work for the lighting system, it is possible for a user (installation worker) to select the pairing configuration mode between the simple configuration mode and the manual configuration mode, using radio remote controller 200.

In addition, the lighting system according to the embodiment includes: a plurality of lighting devices 100 each being configured to function as lighting device 100 described above; radio remote controller 200 having a pairing configuration mode for transmitting repeatedly on a temporary basis, a pairing command including identification information of radio remote controller 200, and a remote control mode for transmitting the radio command; and infrared remote controller 300 which transmits the infrared command.

With this, it is possible to easily perform pairing with less procedure in installation work of a lighting system including a plurality of lighting devices 100 and radio remote controller 200.

Although the pairing method, lighting device 100, and the lighting system according to the present disclosure have been described based on the embodiments, the present disclosure is not limited to the above-described embodiments. Other forms in which various modifications apparent to those skilled in the art are applied to the present embodiment or forms in which some structural components according to the embodiment and modification examples are arbitrarily combined within the scope of the present discloser are also included within the scope of the present disclosure unless such changes and modifications depart from the scope of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A pairing method for use in a lighting system including at least one lighting device serving as a slave device and a radio remote controller serving as a master device to control the slave device, for causing the lighting device to store identification information of the radio remote controller, the method comprising:

transmitting a pairing command repeatedly by the radio remote controller, the pairing command including the identification information of the radio remote controller;

determining, by the lighting device, whether or not the lighting device is in an initial state at power on, the initial state including a condition in which identification information of any master device is not stored in the lighting device;

when it is determined that the lighting device is in the initial state, storing the identification information included in the pairing command as the identification information of the master device in the lighting device when the paring command is received; and causing the lighting device in which the identification information of the master device is stored to operate according to a radio command including the identification information of the master device.

2. The pairing method according to claim 1, wherein in the determining, the lighting device emits light in a first illumination mode when the lighting device is determined as being in the initial state, and the lighting device emits light in a second illumination mode when the lighting device receives the pairing command while the lighting device is determined as being in the initial state.

3. The pairing method according to claim 1, wherein:

the initial state is an electrically factory default state, in the determining, it is determined whether or not the lighting device is in the electrically factory default state, and whether or not the identification information of the radio remote controller serving as the master device is stored in the lighting device, and in the storing:

the lighting device stores the identification information immediately upon receiving the pairing command if the lighting device is determined as being in the electrically factory default state in the determining, and the lighting device suspends storing of the identification information until the lighting device receives a pairing trigger signal from an infrared remote controller after receiving the pairing command from the infrared remote controller, if it is determined that the lighting device is in a state other than the electrically factory default state and that identification information of any master device is not stored in the lighting device in the determining.

4. The pairing method according to claim 1, wherein:

the initial state is a state where no identification information of a master device is stored in the lighting device, the pairing command is either one of a simple configuration command and a manual configuration command, and in the storing:

when the pairing command is the simple configuration command, the lighting device determined as being in the initial state immediately stores the identification information, and when the pairing command is the manual configuration command, the lighting device determined as being in the initial state suspends storing of the identification information until the lighting device receives a pairing trigger signal from an infrared remote controller.

5. The pairing method according to claim 1, wherein the lighting device emits light in a predetermined illumination mode when the lighting device stores the identification information in the storing.

6. The pairing method according to claim 1, further comprising invalidating the identification information stored in the lighting device when the lighting device receives an unpairing signal from an infrared remote controller.

7. The pairing method according to claim 6, wherein, in the causing:

when the lighting device in which the identification information of the master device is stored receives an infrared command other than the unpairing signal from the infrared remote controller, the lighting device discards the infrared command, and when the lighting device in which the identification information of the master device is not stored receives an infrared command from the infrared remote controller, the lighting device operates according to the infrared command.

8. The pairing method according to claim 1, wherein in the storing, after storing the identification information, the lighting device transmits a response signal including identification information of the lighting device to the radio remote controller.

9. The pairing method according to claim 1, wherein the pairing command is repeatedly transmitted for a predetermine time period.

10. The paring method according to claim 1, wherein the lighting system includes a plurality of lighting devices each being configured to function as the lighting device.

11. A lighting device, comprising:

a transceiver which receives a radio command;

a receiver which receives an infrared command;

a storage for storing identification information of a radio remote controller serving as a master device; and a controller, wherein the controller:

determines whether or not the lighting device is in an initial state at power on, the initial state including a condition in which identification information of any master device is not stored in the lighting device;

enters a pairing configuration mode when the controller determines that the lighting device is in the initial state;

when a pairing command including identification information of the radio remote controller serving as the master device is received in the pairing configuration mode, stores the identification information of the radio remote controller serving as the master device as the identification information of the master device to the storage; and causes the lighting device to operate according to a radio command including the identification information, after storing the identification information of the master device.

12. The lighting device according to claim 11, wherein the controller:

selects either one of a simple configuration mode and a manual configuration mode, as the pairing configuration mode, according to a state of the lighting device;

when the pairing configuration mode is the simple configuration mode, stores the identification information to the storage immediately upon receiving the pairing command; and when the pairing configuration mode is the manual configuration mode, suspends storing of the identification information until the lighting device receives a pairing trigger signal from an infrared remote controller after receiving the pairing command.

13. The lighting device according to claim 12, wherein the controller:

determines whether or not the lighting device is in an electrically factory default state, and whether or not the identification information of the radio remote controller serving as the master device is stored in the lighting device;

selects the simple configuration mode when the controller determines that the lighting device is in the electrically factory default state; and selects the manual configuration mode when the controller determines that the lighting device is in a state other than the electrically factory default state and that the identification information of the master device is not stored in the lighting device.

14. The lighting device according to claim 12, wherein, the controller selects either one of the simple configuration mode and the manual configuration mode, as the pairing configuration mode, according to the pairing command.

15. A lighting system, comprising:

a plurality of lighting devices each being configured to function as the lighting device according to claim 11;

radio remote controller having a pairing configuration mode for transmitting repeatedly on a temporary basis, a pairing command including identification information of the radio remote controller, and a remote control mode for transmitting the radio command; and an infrared remote controller which transmits the infrared command.

\* \* \* \* \*